US006448316B1

(12) United States Patent
Hirano et al.

(10) Patent No.: US 6,448,316 B1
(45) Date of Patent: *Sep. 10, 2002

(54) FLAME RETARDANT POLYCARBONATE-STYRENE (OR ACRYLATE) POLYMERS, AND/OR COPOLYMERS AND/OR GRAFT POLYMER/COPOLYMER MIXTURES

(75) Inventors: Yasuo Hirano; Naoki Kikuchi; Morihiko Sugino, all of Kobe (JP); Alan Fernyhough, Guildford (GB); Martin Thomas Davies, Guildford (GB); Philip Toy, Guildford (GB); Joseph Angelo Capitelli, Guildford (GB); Peter John Ives, Guildford (GB)

(73) Assignee: Mitsubishi Engineering-Plastics Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 16 days.

(21) Appl. No.: 09/156,693

(22) Filed: Sep. 18, 1998

(30) Foreign Application Priority Data

Sep. 18, 1997 (GB) ............................... 9719929

(51) Int. Cl.[7] .......................... C08K 5/52; C08K 3/34; C08K 3/24
(52) U.S. Cl. ...................... 524/127; 524/145; 524/451
(58) Field of Search ................................. 524/127, 145, 524/451, 450; 525/67

(56) References Cited

U.S. PATENT DOCUMENTS

| 3,424,703 | A | * | 1/1969 | Jones ......................... 524/450 |
| 4,223,100 | A | * | 9/1980 | Reinert et al. .............. 524/145 |
| 4,692,488 | A | | 9/1987 | Kress et al. |
| 5,061,745 | A | | 10/1991 | Wittmann et al. |
| 5,204,394 | A | | 4/1993 | Gosens et al. |
| 5,272,193 | A | | 12/1993 | Fuhr et al. |
| 5,714,537 | A | * | 2/1998 | Laughner et al. ........... 524/445 |
| 5,723,526 | A | * | 3/1998 | Nagasawa ................... 524/451 |
| 5,783,620 | A | * | 7/1998 | Hamashima et al. ........ 524/451 |
| 5,961,915 | A | * | 10/1999 | Toyouchi et al. ...... 264/331.11 |

FOREIGN PATENT DOCUMENTS

EP 0 755 977 1/1997

* cited by examiner

*Primary Examiner*—Peter Szekely
(74) *Attorney, Agent, or Firm*—Oblon, Spivak, McClelland, Maier & Neustadt, P.C.

(57) ABSTRACT

This invention relates to a polymer mixture which comprises an aromatic polycarbonate (A); a styrene (or styrene derivative and/or (meth)acrylate) containing polymer or copolymer and/or a styrene (or styrene derivative and/or (meth) acrylate) containing graft polymer (B); phosphorous compound(s) which are phosphate or phosphonate or oligomeric or poly-phosphate based flame-retardant(s) (C); specific inorganic additive(s) (D); and further flame retardant(s) or anti-drip agent(s) (E): and optionally, other additives.

13 Claims, No Drawings

FLAME RETARDANT POLYCARBONATE-STYRENE (OR ACRYLATE) POLYMERS, AND/OR COPOLYMERS AND/OR GRAFT POLYMER/COPOLYMER MIXTURES

This invention relates to a polymer mixture which comprises an aromatic polycarbonate (A); a styrene (or styrene derivative and/or (meth)acrylate) containing polymer or copolymer and/or a styrene (or styrene derivative and/or (meth)acrylate) containing graft polymer (B); phosphorous compound(s) which are phosphate or phosphonate or oligomeric or poly-phosphate based flame-retardant(s) (C); specific inorganic additive(s) (D); and further flame retardant(s) or anti-drip agent(s) (E): and optionally, other additives.

Polymer mixtures which comprise an aromatic polycarbonate, a styrene-containing copolymer and/or graft polymer, for example, ABS, and a flame-retardant are known, for example, from U.S. Pat. Nos. 4,692,488, 5,204,394, and 5,061,745. According to this prior art an organic phosphate ester, for example, triphenyl phosphate, tricresyl phosphate, diphenylcresyl phosphate, and/or oligomeric phosphates, can be used as a flame-retardant for such mixtures. Tetrafluoroethylene polymers are often used in combination with such phosphate esters to provide flame retardant mixtures and mouldings which can achieve a flammability rating of UL-V0 in the UL-94 vertical burning test typically at a thickness of 1.6 mm, together with good impact strength. In other prior art other additives may assist anti-dripping or flame retardancy such as aramid fibres (U.S. Pat. No. 5,272,193).

However thermoplastic moulding compounds of the type described in the prior art have the disadvantage that if a UL-V0 flammability rating is required in thinner sections or thinner moulded articles—and it is generally more difficult to achieve flame retardancy in thinner sections—then it is not clear that such compositions could achieve such performance and still retain other useful properties.

Increasing the level of the phosphate flame retardant additive may not be successful in achieving the desired flame retardant rating at lower than typical thicknesses and will in any case reduce other useful properties such as impact strength and/or heat distortion temperature (HDT) significantly.

The present invention also relates to moulding compounds and articles formed or moulded from the polymer mixtures or compounds according to the invention. The polymer mixture according to the invention comprises the following constituents:

(A) aromatic polycarbonate(s), and
(B) styrene-containing polymer(s)/copolymer(s) and/or styrene-containing graft polymer(s), (or substituted styrene analogues/derivatives), and/or (meth) acrylate based polymer(s), copolymer(s), graft polymer(s) (where '(meth)acrylate' is understood to encompass either or both of acrylate, methacrylate) and
(C) phosphorous compound(s) based on phosphate ester (s) and/or oligomeric phosphate(s), and/or polyphosphate(s) or phosphonate ester(s), and
(D) inorganic additive(s) selected from talc, kaolin, mica, and magnesium hydroxide and
(E) further flame-retardant(s) and/or anti-drip agent(s) selected from tetrafluorethylene polymers or copolymers, polyvinylidenedifluoride, other fluoropolymers, red phosphorous, aramid fibre or powder or polyimide fibre or powder; and, optionally, other additives.

In the discussion of compositions references are to parts by weight per 100 parts of (A)+(B), as defined above—except where '%' is used which, then describes weight % of the total of (A)+(B)+(C)+(D)+(E) components.

In the prior art, many flame retardant polycarbonate based moulding compounds also containing styrene and/or (meth) acrylate based polymers are reported to exhibit UL94-V0 rating at thicknesses of 1.5 mm or 1.6 mm, or greater and are based on compounds containing (A), (B), (C), and (E) as defined above. Within the present invention it is surprising to achieve UL94-V0 flame retardancy performance at thicknesses substantially below this thickness level simply by the incorporation or addition of the particular stated inorganic additives (D).

The compositions of the present invention are specifically designed for use in thin wall mouldings and in particular to those mouldings or parts where, in some portion of the mouldings or assembled parts, & same retardancy to meet the requirements of UL-94-V0 performance at a thickness lower than 1.5 mm is required or desired. In particular, UL-V0 performance at or below 1.2 mm, 1.1 mm, 1.0 mm, 0.9 mm, 0.8 mm, 0.7 mm, 0.6 mm, 0.5 mm, 0.4 mm, and/or any thickness or range within these thicknesses can surprisingly be achieved with retention of useful other properties, by addition or incorporation of the stated inorganic additive (D) to mixtures of (A), (B), (C), and (E), as defined herein. The formulations will also be able to achieve UL-V0 performance at thicknesses greater than these.

Compositions for achieving UL-V0 performance at thicknesses of 1.5 mm or greater are well known, as mentioned above. However recent trends in thin wall mouldings for many applications require or desire UL-V0 flammability performance in some parts or sections of the moulding or assembled parts at thicknesses less than 1.5 mm and for example at thicknesses of 1.2 mm or 1.1 mm or 1.0 mm or 0.9 mm or 0.8 mm or 0.7 mm or 0.6 mm or 0.5 mm or 0.4 mm or at thicknesses in between or below such values. In addition, the absence of chlorine or bromine contain flame retardants is desired due to environmental reasons or regulations and the compositions of the present invention are designed to allow flame retardancy in such thin sections as described without the use of chlorine or bromine based flame retardants.

The compositions of the present invention are designed for flame retardant mouldings, or mouldings in which some portion require or desire such flame retardancy for use in parts and housings of electronic equipment, business machines, including computers, monitors, keyboards, printers, fax machines, telephones, office automation or audio-visual equipment and particularly in portable or compact or lightweight items or versions such as notebook computers, palm-top or hand-held computers, or electronic diaries or personal organisers, mobile telephones, cameras and video cameras, portable audio items and related ancillary equipment.

In many such applications, in addition to flame retardancy there will also be other requirements such as impact strength (as often measured by the Notched Izod Impact test) and/or a certain level of heat resistance, as for example commonly measured by HDT (heat distortion temperature).

The actual specifications will of course vary according to the different applications and indeed different models of the applications. However, the compositions of the invention are designed to exhibit flame retardancy associated with a UL-V0 rating according to the UL94 V test at thicknesses below 1.5 mm as described and also show reasonable impact strength and reasonable HDT for use in such applications as measured via the notched izod impact test (ISO 180-1A) and the HDT test (ISO 75 at 1.8 MPa).

It is known in polycarbonate based compositions and compositions based on blends containing polycarbonate and styrenic and/or (meth)acrylate based polymers, copolymers or graft copolymers that phosphate ester based flame retardants will reduce properties such as impact strength and HDT. The greater the loadings of such additives generally the greater the fall off in these properties. Higher loadings of such phosphates can impart flame retardant performance up to a point, but very high loadings such as for example more than 16 parts or 17 or 18 or 18.4 or more parts by weight (per 100 parts by weight of (A)+(B), as described herein) are not particularly effective for use in thin wall mouldings such as those which are the subject of this present invention since either impact strength and/or HDT becomes too low and very high phosphate loadings can give other problems in migration of the phosphate and relatively poor chemical resistance.

The use of inorganic fillers or additives in moulding compounds is well known and they are routinely used for providing reinforcements or stiffness and/or lowering cost. In many publications and patents, the use of fillers are thus described as components, often optional of moulding compounds including flame retardant polycarbonate based and mixtures of polycarbonate and styrenic and/or (meth)acrylate based formulations. However, we have found that certain specific inorganic fillers can be used advantageously to impart a surprising attainment of thin section flame retardancy, as measured by UL-94-V0 performance, at thicknesses below 1.5 mm as described above, and at the same time can achieve reasonable impact strength and HDT suitable for use in the applications described. In this respect the particular inorganic fillers are not selected for reinforcement but rather because of their apparent ability to impart enhanced flame retardancy and/or anti-dripping to the compositions. It appears that there may possibly be some synergism between such specific inorganic fillers and the other components of the compositions particularly the other flame retardant or anti-drip additives present.

Particular fillers which have been found useful to impart this combination of properties are talc, kaolin, magnesium hydroxide, and mica, Other commonly used fillers or reinforcements do not show this same ability to achieve such thin section UL-V0 performance at similar thickness levels (flammability resistance as measured by the UL-94V test is usually more difficult to achieve in thinner specimens) and also retain other good properties. Thus, for example, glass beads, calcium carbonate, titanium dioxide, aluminium oxide, wollastonite, and vermiculite, all of which are common fillers and often listed as examples of common fillers or reinforcements for plastic mouldings do not show the same ability to achieve such thin section UL94-V0 ratings such as below 1.5 mm and in particular at 1.2 mm or below or at 1.0 mm or below, described herein, and also achieve reasonable other properties such as impact strength and HDT.

Data shown in the Tables of Examples illustrate examples of the invention together with comparisons of formulations without added fillers and with some example fillers which are not effective for flame retardant properties as measured by the UL94 V test and achieving V0 in thin sections as described above.

The impact strength of compositions containing very high filler loadings is unlikely to be useful in many thin wall moulded applications. From our experience, in actual applications in thin wall mouldings of parts for portable notebook computers, mobile phones, video camera, portable audio equipment and general office automation equipment a lower reasonable limit for our notched izod values would be in the region of 6–7 and preferably 7–8 KJ/sq m, and a HDT value of 70° C. or more is desirable. Notched izod impact strength values of about 8 KJ/sqm or more are most preferred and HDT values of 70° C. or more or of 72° C. or more are preferable. It can be seen from examples of the compositions of our invention that the reasonable lower limits of such properties are achievable with concurrent thin section UL-V0 flammability at 1.0 mm. Indeed izod values above 8 KJ/sqm and even in excess of 10 KJ/sqm together with HDT values of 70° C. or more and even of 72° C. or 74° C. or more are achieved with the formulations of the invention whilst achieving UL-V0 flame retardant performance in thin sections of 1.0 mm or even lower, and without the use of bromine or chlorine based flame retardants.

Very high loadings of inorganic additive may not be so useful (see for example 10–56 in the Table of Examples), and, similarly very high loadings of phosphate esters would not be so useful. In Tables of Examples, example numbers 11–86, 11–83 and 12–07 show the effects of high phosphate loadings; such high levels do not always achieve the required flame retardancy and/or do not allow attainment of a suitable HDT of 70° C., and/or impact strength is sometimes low.

Generally within the compositions, phosphate or phosphorous compound (component C) levels of about 16 parts by weight (per 100 parts by weight of (A)+(B)) or less, are required in order to achieve a reasonable HDT and/or impact strength. When the specific inorganic filler is present as specified in our invention the component (C) additives can be present at such desired lower levels to achieve the thin wall flame retardancy and this allows a good balance of impact strength and HDT to be achieved. Thus component (C) levels of 16 parts by weight or less can be used and preferably 15 parts by weight or less or 14 parts by weight or less, per 100 parts by weight of (A)+(B). A certain minimum level of (C) components is also required and this is about 8 parts by weight, to achieve the required flame retardancy in thin wall mouldings prepared from compositions of the invention. Thus 8–16 or 8–15 or 8–14 or 8–13 parts by weight of component (C) per 100 parts by weight of (A)+(B) are most useful in the compositions of the invention where the specified inorganic filler (D) is present as described herein, to provide compositions which can achieve UL-V0 flame retardancy at 1.0 mm thickness and a heat distortion temperature (HDT) of 70° C. or 72° C. or 74° C. or more.

In our compositions the presence of up to 12 parts by weight (per 100 parts of (A)+(B) of the specified inorganic fillers (D) in the compositions of the invention allows flame retardancy in thin sections together with reasonable impact strength and a good HDT of 70° C. or more, suited to thin wall applications as mentioned herein and which combination of properties is not achievable by simply increasing the level of phosphate ester flame retardants within the ranges of components specified. In addition lower levels of inorganic filler (D) can be effective and achieve a good balance of such properties including 10, 9, 6, 5, 3, 2, 1 and just 0.6 parts by weight—per 100 parts of (A)+(B). The particular filers (D) are effective at 9, 7.5, 5, 4.9, 4.4, 3.0, 2.5, 2.0 ,1.5, 1.0 and even just 0.5 weight % of (A)+(B)+(C)+(D)+(E) and at loadings in between these. This is illustrated in examples 11–70–11–80 inclusive and 11–88 and 10–55 and in other examples shown.

Thus the use of the inorganic additive (D) allows attainment of such V-0 rating with relatively lower levels of organic phosphate ester and related flame retardants. This will help to maintain a reasonable service temperature capability or heat distortion temperature (HDT) via the relatively lower levels (than otherwise may have been needed in the absence of component (D)) of component (C) and/or some possible small improvement due to the filler's presence and/or help to maintain or improve stiffness of a moulding and/or help reduce plasticisation/migration problems which often occur during moulding or in service due to the presence of high loadings of phosphate esters. The flow of the compounds of the invention is sufficient to allow injection moulding of complex parts which contain, in part at least, sections which are as thin as those thickness mentioned above. In addition the formulations of the invention achieve these thin section flame retardant performances with low levels of the additional fame retardant or anti-drip agent (E), and this is an advantage in that such additives, for example, polytetrafluoroethylene (PTFE) are very expensive.

The ratios of polycarbonate and other polymer will have influence on these properties but our compositions are rather specifically targeted at achieving the combinations of properties useful in thinner wall moulded parts as described and using compositions defined within the limitations described below.

The polymer mixture can be obtained according to the conventional techniques of preparing polymer mixtures, for example, by compounding the said constituents in an extruder or continuous mixer or co-kneader. The compositions can be prepared by mixing the respective constituents in known manner and then melt-compounding or melt-extruding the resulting mixture in standard units, such as internal kneaders or single-screw or twin-screw extruders, at temperatures, for example, in the range from 190 to 330° C. or more preferably in the range of 200° C. to 280° C. The individual constituents may be mixed in known manner either gradually or at the same time either around room temperature or at a higher temperature or lower temperature.

The moulding compounds according to the present invention may be used for the production of mouldings. In particular, mouldings may be produced by injection moulding or blow moulding. Another form of processing is the production of mouldings by deep drawing from prefabricated sheets or films.

The achievement of UL-V0 at thicknesses below 1.6/1.5 mm is not common in compositions of this type, particularly those based on PC-ABS systems. The compositions of the invention which use a combination of stated inorganic additive(s) with organic phosphorous compound(s) (eg phosphate ester), optionally with a fluorinated polymer (eg PTFE), together with polycarbonate (PC) and acrylonitrile-butadiene-styrene (ABS—or other styrene copolymer/styrene graft polymer combination) can achieve UL-V0 in a moulded thickness, thinner than is ordinarily known or expected. Furthermore such formulations can, by virtue of retaining good flow, still be readily moulded, eg by injection moulding into such thin sections or into parts containing areas or sections with such thin walls.

Thus the range of compositions (per 100 parts by weight for a total for all the components ((A)+(B)) as specified by the invention are those which comprise:

(A) aromatic polycarbonate(s) at 70–85 or 73–85 parts by weight, preferably 75–85 parts by weight;

(B) one or more polymer and/or, copolymer and/or graft polymer containing styrene or styrene derivatives and/or acrylate or methacrylate present at a total of 15–30 or 15–27 parts, preferably 15–25 parts by weight, (C) phosphorous compound(s) which are phosphate ester (s) or phosphonate(s) or or oligomeric or polyphosphates, or mixtures thereof at 8–16 parts by weight, and preferably 8–15 or 8–14 or 8–13 parts by weight, per 100 parts by weight of (A)+(B);

(D) inorganic filler(s) which function to impart enhanced flame retardancy and/or anti-dripping in thin wall mouldings and which are selected from talc, kaolin, mica, and magnesium hydroxide, and which are present, in total, at 0.5 or 0.6–12 parts, preferably 0.5 or 0.6–5, or 0.5 or 0.6–4.9 parts by weight per 100 parts by weight of (A)+(B), or which are present at a minimum of 0.5 weight % of the total of the components (A)+(B)+(C)+(D)+(E) and at 10 weight % or less 8 weight % or less or less than 5 weight %.

(E) at least one other flame retardant additive or anti-drip agent selected from tetrafluoroethylene polymers or copolymers, vinylidene polymers or copolymers, other fluoropolymer, or red phosphorous or aramid fibre or powder or polyimide. Fibre or powder, though preferably a tetrafluoroethylene polymer or red phosphorous present at 0.1–3 or 0.1–2.5 parts, preferably 0.2–25 parts by weight per 100 parts by weight of (A)+(B).

Other additives may optionally be included.

A. Aromatic Polycarbonates

Thermoplastic aromatic polycarbonates are materials known and are generally prepared by reaction of dihydric phenols compound with a carbonate precursor.

Dihydric phenols which may be used in the preparation of the aromatic polycarbonates include mononuclear or polynuclear aromatic compounds which comprise two hydroxy radicals each directly bonded to a carbon atom of an aromatic nucleus. Said dihydric phenols may be substituted with one or more alkyl groups. Mixtures of dihydric phenols may be used. Halogen free polycarbonates are preferred. Bisphenol-A and/or its alkyl substituted derivatives, other bisphenols such as Bisphenol-S, Bisphenol-F, or 1,1-bis-(4-hydroxyphenyl)-cyclohexane or phenolpthalein may also be used in the preparation of useful polycarbonates.

Branched polycarbonates are known and are also suitable. Copolycarbonates are also suitable for the invention and the so-called polyester carbonates which are obtained by performing the polymerisation reaction in the presence of an ester precursor, for example, a difunctional carboxylic acid, for example, terephthalic acid, isophthalic acid, naphthalene dicarboxylic acids, cycloaliphatic diacids, or ester-forming derivatives thereof. These polyester carbonates have ester bonds and carbonate bonds in the polymeric chain may be used.

It is also possible to use a mixture of various polycarbonates and/or copolycarbonates, including simple mixtures of different molecular weight ranges or grades of commercial or common polycarbonates.

B. Styrene (and/or (Meth)Acrylate)-Containing Polymers, Copolymers and/or a Styrene (and/or (Meth)Acrylate)-containing Graft Polymers/Copolymers Styrene-containing polymers are polymers, or copolymers or terpolymers or multicomponent or graft polymers which contain units derived from styrene, and/or alpha-methyl styrene and/or styrene compounds substituted with one or more organic groups in the aromatic nucleus. They may contain units derived from acrylonitrile and/or methacrylonitrile and/or maleic anhydride and/or a derivative of maleic acid anhydride and/or (meth)acrylic monomer or other comonomers. Suitable derivative of maleic anhydride are maleimides and N-substituted maleimides, such as N-phenyl maleimide. Suitable acrylic monomers are, for example, methyl methacrylate, (meth)acrylic acid, methyl acrylate, ethyl (meth) acrylate, butyl (meth) acrylates, and other alkyl or alkoxylated, cycloaliphatic, or aryl, or phenoxyalkyl acrylates. These copolymers can be obtained according to conventional methods of preparing such polymers, copolymers. Bromine and chlorine free polymers, copolymers and graft polymers are preferred.

The polymer mixture according to the invention may comprise, as a styrene containing copolymer, a copolymer built up from (1) styrene, and/or alpha-methyl styrene and/or a styrene substituted with one or more organic groups in the aromatic nucleus and (2) a methacrylonitrile and/or acrylonitrile and/or maleic anhydride and/or derivative of maleic anhydride (such as N-phenylmaleimide) and/or (meth) acrylic monomer.

(Meth)acrylate contain polymers are polymer, copolymers or terpolymers or graft or multicomponent polymers which contain acrylate or methacrylate units such as those prepared from methyl methacrylate and/or other esters of acrylic/methacrylic acids including aliphatic, alkoxylated, cycloaliphatic, aromatic, meth(acrylate) esters, and/or acrylic/methacrylic acid and/or vinyl esters and/or maleic anhydride and its derivatives and/or acrylonitrile/methacrylonitrile, and, optionally, styrene or styrene derivatives/substituted styrenes or other comonomers.

Styrene and/or (meth)acrylate-containing graft polymers are obtained by grating monomers onto a rubber. Examples of suitable rubbers are polybutadiene, butadiene-styrene, butadiene-acrylonitrile, copolymers and other rubbers, such as for example, acrylate rubbers, siloxane rubbers, fluorinated rubbers/elastomers and EPDM rubbers. A mixture of monomers can be grafted on to these rubbers. Suitable monomers include vinyl functional monomers such as acrylate/methacrylate esters, styrene and its derivatives, acrylonitrile/methacryonitrile, maleimides, maleic anhydride and other derivatives of maleic anhydride, acrylic/methacrylic acid, or other radically polymerisable structures.

The polymer mixtures according to this invention preferably comprise, as a graft polymer, the product obtained by grafting a mixture of styrene and/or alphamethyl styrene and/or a styrene substituted with one or more alkyl and/or other organic groups in the aromatic nucleus and a methacrylonitrile and/or acrylonitrile and/or maleic anhydride and/or a derivative of maleic anhydride such as maleimides, and/or (meth)acrylic monomer/(meth) acrylate ester on a rubber.

The polymer mixture according to the invention may comprise a mixture of a styrene copolymer and a styrene graft polymer, such as styrene-acrylonitrile (SAN) and acrylonitrile-butadiene-styrene (ABS). Alternatively, or in addition, the polymer mixture may contain as a styrene or (meth) acrylate based polymer a core-shell impact modifier such as those commercially available from Rohm & Haas under the name of 'Paraloid' and similar products. Mixtures of such materials may be used.

C. Phosphorous Compounds

The polymer mixture of the invention comprises a phosphorous compound which is a phosphate or phosphonate ester. This may be a mono-phosphate (such as a triaryl or trialkyl or tri-(aryl-alkyl) phosphate or a mixed phosphate and/or phosphonate ester, and/or a diphosphite such as resorcinol-, hydroquinone-, bisphenol-A- or other bisphenol-diphosphite or other diphosphate of a multihydric compound and/or an oligomeric phosphate or phosphonate derived from such dihydric or multihydric compounds, or any other polyphosphate. Phosphorus compounds of component (C), suitable for use in accordance with the invention include, for example, such diphosphates, triphenylphosphate, tricresylphosphate, tri-butylphosphate, diphenyl-2-ethyl cresylphosphate, tri-(isopropyl-phenyl)-phosphatic, methylphosphonic acid diphenyl ester, phenyl phosphonic acid diethyl ester, diphenyl cresylphosphate, tributylphosphate, and oligomeric phosphates.

Oligomeric phosphates which may be used in the polymer mixture according to the invention can be either used as separate compounds or in the form of a blend of several different oligomers. Mixtures of monophosphate, or other phosphate, esters and oligomeric phosphates may be used. Examples of some oligomeric phosphates are given in U.S. Pat. No. 5,204,394, but other oligomeric structures are also suitable. Where the phosphates and/or oligophosphates are liquids or low melting solids they may be used directly (fed into extruder), or as a masterbatch in another polymer such as polycarbonate or a styrenic or acrylic based polymer, copolymer, terpolymer, grafted polymer, or any other polymer, including ethylene copolymers such as ethylene vinyl acetate copolymers, or they may be pre-absorbed or adsorbed onto a suitable substrate such as silica or porous polymer or other porous or high surface area particles, thus producing a free flowing powder.

D. Inorganic Additive

Inorganic fillers and additives are known in plastic compounds. Those suitable in the invention are selected from those generally known as talc, mica, kaolin (including calcined grades), or magnesium hydroxide. A mixture of such fillers, or different grades of such fillers/additives may be used. Minerals which are predominantly of these types are also useful.

The preferred particular inorganic additives or fillers are those which are finer grades, where available, though this is not essential to function as an effective additive for enhancing flame retardancy and/or anti-dripping in the compounds. Talc is a particularly preferred additive in finer particle grades. In some cases the inorganic additive may used as a neat powder, or it may be used as a masterbatch in another polymer or binder or carrier.

Particle size distributions such as those with more than 50 weight % of particles of 8 microns or less, or more than 70 weight % less than 8 microns, or more than 90 weight % less than 8 microns, are useful. Filler particle size distributions such as 95% or 98% by weight of particles less than 8 microns are useful. Particle size distributions with 90 weight % or 95 weight % or 99 weight % less than 10 microns are useful. Filler particle size distributions with 70 or 80 or 90 weight % less than 4 or 5 microns are also suitable. Other ranges outside of these are also useful.

The inorganic additive may contain water of crystallsiation or other forms of absorbed or adsorbed water. Various surface treatments or coatings or coupling agents may be present, if desired, on the fillers. Such coating may include coupling agents or adhesion promoters.

E. Further Flame-Retardants

In addition to the above phosphates or phosphonates the polymer mixture according to the invention also comprises further agent(s) with flame-retarding or anti-dripping properties, selected from fluorine containing polymers, particularly tetrafluorethylene polymer(s) or vinylidenedifluoride polymers, red phosphorous, or aramid powder or fibre, or polyimide fibre or powder.

The fluoropolymers suitable for use in accordance with the include polytetrafluoroethylene, tetrafluoroethylene-hexafluoropropylene copolymer or tetrafluoroethylene copolymers containing small quantities of fluorine-free, copolymerizable, ethylenically unsaturated monomers, or polyvinylidene difluoride or copolymers containing vinylidene difluoride. Tetrafluoroethylene polymers are preferably used. Suitable tetrafluoroethylene polymers may be in powder or fibril form and/or may be used in the form of a coagulated mixture of emulsions of the tetrafluoroethylene polymers with emulsion(s) of the graft and/or other polymer components.

Red phosphorous may be used as a micro-encapsulated or coated or stabilised material (eg Amgard CRP by Albright & Wilson) and should be used carefully. The red phosphorous may be used as received or as a masterbatch in which the red phosphorous is predispersed in another polymer such as a polycarbonate, a thermoplastic polyester resin such as polyethylene terephthalic or polybutylene terephthalate, or in a styrene or acrylate containing polymer, including homopolymers, copolymers, terpolymers, and grafted polymers as mentioned above under (B), or in an ethylene or propylene polymer or co or ter-polymer such as ethylene-vinyl acetate, ethylene-ethyl acrylate, ionomers, or in a blend such as polycarbonate-acrylonitrile-butadiene-styrene (PC-ABS), or in any other polymer or carrier.

Aramid fibres or powders are known and can be used as chopped fibres, floc or fibrils or as particles (spherical or irregular shaped). Useful aramid fibres or powders are supplied by Du Pont ('Kevlar') or Akzo ('Twaron') for example.

Other Additives

Other additives may be optionally included.

In addition to the constituents already mentioned the polymer mixture according to the invention may contain one or more conventional additives, for example other fillers, reinforcing fibres, stabilsers, flow aids, antioxidants, pigments and dyes, impact modifiers, plasticisers, mould release agents and antistatic agents. Thus, for example, the thermoplastic moulding compounds according to the invention may contain other known additives for polycarbonates, or styrenic and/or meth(acrylate) based homo-, co- ter- and graft polymers or for other thermoplastic polymers.

Flow improvement agents such as siloxane or other silcon containing polymers may also be present. Other flow additives such as polyolefin or functional polyolefins or polyolefin copolymers, including ionomeric waxes or low molecular weight polymers may also be present. Polyester, synthetic and/or natural, and polyether waxes or additives may also be used.

Coupling agents or adhesion promoters may be included. Example coupling agents include silanes, often with various reactive organic functionality; titanates including neoalkoxy titanates and mixed alumino- or silicon- titanates and phosphorus containing titanates; aluminates and zirconium aluminates and zirconates. Preferred coupling agents are silanes and/or titanate compounds such as those in the KenReact/Lica range supplied by Kenrich Inc., Bayonne, USA. Typically such coupling agents are used at low levels such as less than 0.1–5 parts by weight of the inorganic filler(s).

Pigments such titanium dioxide and/or carbon black may be used. Other pigments may be used.

EXAMPLE

Components shown in the tables below were compounded in a twin screw extruder at temperatures between 200–280° C. and usually between 230–250° C. After pelletisation and drying, the pellets were injection moulded into test specimens according to those specified in the UL-94V flammability test. Samples of the UL specified dimensions and with tmm, where t=thickness (eg 1.2 mm or 1.0 mm or other thickness) were injection moulded, conditioned, and tested according to the procedures of UL94 specification.

The UL-94-V-0 classification is achieved it within the specified test:

afterflame time for each individual specimen, $t_1$ or $t_2$, is no longer than 10s;

total afterflame time for any condition set $(t_1+t_2)$ for the 5 specimens is no longer than 50s;

afterflame time plus afterglow time for each individual specimen after the second flame application $(t_2+t_3)$ is no longer than 30s;

no afterflame or afterglow of any specimen occurs up to the holding clamp;

no test specimen ignites the cotton indicator by flaming drops or particles.

Other UL-94 classifications (egV-1, V-2) are less flame retardant than V-0, and apply to systems which do not fulfil the above criteria for V-0. 'Fail' is where the samples continue to burn for 30s.

The attainment of a UL rating at a particular thickness will usually be indicative that thicknesses above this particular thickness will also be able to achieve the same rating, within a reasonable range and this is usually confirmed within the UL test by testing specimens at two (or more) thicknesses, usually within 3.2 mm of each other. Thus, in one example, a desired, lower, thickness and also another thickness of 2–3mm mm thicker than the lower thickness can be used. This may allow a 'minimum thickness' rating at the lower thickness tested, if all the criteria for the UL-94 test are met.

The flame (or burning) test results reported in the tabulated data are from evaluations in our Laboratory according to the guidelines and recommendations of the UL-94 burning test procedure. A flame test 'V-0' result is one in which the criteria specified above (in the UL-94 test procedure) for V-0 have been met in our own evaluations. Similarly for 'V-1', 'V-2' and 'FAIL'.

For notched izod and HDT tests sample were injection moulded according to the dimensions of the specifications ISO 180-specimen type 1A (4 mm thickness) for notched izod tests and ISO 75 at 1.8 MPa (120° C./hr heating rate with 10 m×4 mm×120 mm samples and using a 100 mm span).

Tables of Example Compositions

| Tables of Examples | | | | | | | | | |
|---|---|---|---|---|---|---|---|---|---|
| REF NO | 10-55 | 10-56 | 11-86 | 11-83 | 11-87 | 11-70 | 11-80 | 11-71 | 11-88 |
| PC-26 | 80.9 | 83.4 | 80.9 | 80.9 | 80.9 | 80.9 | 80.9 | 80.9 | 80.9 |
| ABS-F | 19.1 | 16.6 | 19.1 | 19.1 | 19.1 | 19.1 | 19.1 | 19.1 | 19.1 |
| TPP | 6.4 | 7.2 | 11.6 | 9.2 | 12.7 | 10.4 | 8.1 | 8.1 | 11.6 |
| oligomer | 6.2 | 7.1 | 11.6 | 9.2 | | | | | |

-continued

Tables of Examples

| | | | | | | | | | | |
|---|---|---|---|---|---|---|---|---|---|---|
| Talc | 3.5 (3.0%) | 30.1 (20.8%) | | | | | 5.8 (5%) | 3.5 (3.1%) | 11.6 (9.7%) | 3.5 (3.0%) |
| PTFE | 0.3 | 0.3 | 0.5 | 0.5 | 0.5 | | 0.5 | 0.5 | 0.5 | 0.5 |
| Izod 4 mm/kJ/sq.m | 11.5 | 3.3 | 3.3 | 5.6 | 33.5 | | 11.7 | 30.6 | 10.4 | 28.9 |
| flame test 1 mm | V-0 | V-0 | V-0 | V-0 | V-1/V-2 | | V-0 | V-0 | V-0 | V-0 |
| flame test 0.9 mm | V-0 | | | | | | V-0 | V-0 | V-0 | V-0 |
| HDT/° C. | | | 60 | 67 | 76 | | 82 | 88 | 90 | |

| REF NO | 11-72 | 11-73 | 11-74 | 11-75 | 11-76 | 11-67 | 11-77 | 11-68 | 11-78 | 11-69 | 11-79 |
|---|---|---|---|---|---|---|---|---|---|---|---|
| PC-26 | 80.9 | 80.9 | 80.9 | 80.9 | 80.9 | 80.9 | 80.9 | 80.9 | 80.9 | 80.9 | 80.9 |
| ABS-F | 19.1 | 19.1 | 19.1 | 19.1 | 19.1 | 19.1 | 19.1 | 19.1 | 19.1 | 19.1 | 19.1 |
| TPP | 12.7 | 12.7 | 12.7 | 12.7 | 12.7 | 12.7 | 12.7 | 12.7 | 12.7 | 12.7 | 12.7 |
| Talc | 17.3 (14.7%) | 11.6 (9.3%) | 9.2 (7.5%) | 5.8 (4.9%) | 5.2 (4.4%) | 3.5 (3.0%) | 2.9 (2.5%) | 2.3 (2.0%) | 1.7 (1.5%) | 1.2 (1.0%) | 0.6 (0.5%) |
| PTFE | 0.5 | 0.5 | 0.5 | 0.5 | 0.5 | 0.5 | 0.5 | 0.5 | 0.5 | 0.5 | 0.5 |
| Izod 4 mm/kJ/sq.m | 6.2 | 7.3 | 7.5 | 8.7 | 8.8 | 11.8 | 17.6 | 20.9 | 21.3 | 11.8 | 25.2 |
| flame test 1 mm | V-0 | V-0 | V-0 | V-0 | V-0 | V-0 | V-0 | V-0 | V-0 | V-0 | V-0 |
| HDT/° C. | 81 | | 78 | 77 | | 76 | | | | 76 | 76 |

| REF NO | 11-81 | 11-82 | 10-76 | 10-92 | 10-90 | 10-75 | 10-97 | 10-98 | 11-85 | 10-96 | 11-05 |
|---|---|---|---|---|---|---|---|---|---|---|---|
| PC-26 | 80.9 | 80.9 | 80.9 | 80.9 | 80.9 | 80.9 | 80.9 | 80.9 | 80.9 | 80.9 | 80.9 |
| ABS-F | 19.1 | 19.1 | 19.1 | 19.1 | 19.1 | 19.1 | 19.1 | 19.1 | 19.1 | 19.1 | 19.1 |
| TPP | 12.7 | 12.7 | 12.7 | 12.7 | 12.7 | 12.7 | 12.7 | 12.7 | 12.7 | 12.7 | 12.7 |
| PTFE | 0.5 | 0.5 | 0.5 | 0.5 | 0.5 | 0.5 | 0.5 | 0.5 | 0.5 | 0.5 | 0.5 |
| Talc | | | 3.5 (3.0%) | | | | | | | | |
| TiO2 | | | | | | | 3.5 (3.0%) | | | | |
| CaCO3 | | | | | | | | 3.5 (3.0%) | | | |
| Mg(OH)2 | | | | 3.5 (3.0%) | | | | | | | |
| Mica | 3.5 (3.0%) | | | | | | | | | | |
| Kaolin | | 3.5 (3.0%) | | | | | | | | | |
| Glass Beads | | | | | | | | | 3.5 (3.0%) | | |
| wollastonite | | | | | 3.5 (3.0%) | | | | | | |
| Al-oxide | | | | | | | | | | 3.5 (3.0%) | |
| vermiculite | | | | | | | | | | | 3.5 (3.0%) |
| Izod 4 mm/kJ/sq.m | 12.9 | 11.9 | 11.8 | | | | | | 5.9 | | |
| flame test 1 mm | V-0 | V-0 | V-0 | V-0 | V-1 | V-1/V-2 | V-1 | V-1 | FAIL | V-2 | V-2 |
| flame test 1.2 mm | V-0 | V-0 | V-0 | V-0 | V-1 | V-1/V-2 | V-0/V-1 | V-2 | FAIL | V-0/V-1 | V-2 |

| REF NO | 11-89 | 11-90 | 11-91 | 11-92 | 11-94 | 11-98 | 12-03 | 11-99 | 12-04 | 12-00 | 12-05 |
|---|---|---|---|---|---|---|---|---|---|---|---|
| PC-26 | 80.9 | 80.9 | 80.9 | 80.9 | 80.9 | 75 | 75 | 75 | 75 | 75 | 75 |
| ABS-F | 19.1 | 19.1 | 19.1 | 19.1 | 19.1 | 25 | 25 | 25 | 25 | 25 | 25 |
| ABS-C | | | | | | | | | | | |
| SAN | | | | | | | | | | | |
| TPP | 10.4 | 9.2 | 8.1 | 6.9 | 12.7 | 13 | 13 | 14 | 14 | 15 | 15 |
| Talc | 3.5 (3.1%) | 3.5 (3.1%) | 3.5 (3.1%) | 3.5 (3.2%) | 23.1 (16.9%) | 3.5 (3.0%) | | 3.5 (3.0%) | | 3.5 (2.9%) | |
| PTFE | 0.5 | 0.5 | 0.5 | 0.5 | 0.5 | 0.5 | 0.5 | 0.5 | 0.5 | 0.5 | 0.5 |
| Izod 4 mm/kJ/sq.m | 31.5 | 34.9 | 34.9 | 39.8 | 5.1 | 35.5 | 39.4 | 31 | 40 | 28.9 | 35.2 |
| flame test 1 mm | V-0 | V-0 | V-0 | FAIL | V-0 | V-0 | V-2 | V-0 | V-2 | V-0 | V-2 |
| HDT/° C. | | | | | | 74 | 73 | 72 | 71 | 70 | 68 |

| REF NO | 10-84 | 11-57 | 10-87 | 11-58 | 10-80 | 10-82 | 10-83 | 10-79 | 12-80 | 12-55 |
|---|---|---|---|---|---|---|---|---|---|---|
| PC-26 | | | | | | 73.3 | 81.4 | | | 75 |
| PC-28 | 80.5 | 80.5 | 80 | 80 | 70 | | | 77 | 77 | |
| ABS-F | | | | | | | | | | 25 |
| ABS-C | 19.5 | 19.5 | 20 | 20 | 30 | 26.7 | 18.6 | 23 | 23 | |
| TPP | 4.9 | 4.9 | 5.9 | 5.9 | 7 | 11 | 12.8 | 7.1 | 7.1 | 13 |
| oligomer | 4.9 | 4.9 | 5.9 | 5.9 | 8.3 | | | 7.1 | 7.1 | |
| talc | | | 5.9 (5.0%) | | | 5.8 (4.8%) | 10.3 (8.0%) | | 3.5 (3.0%) | 2 (1.7%) |
| kaolin | 12.3 (10.0%) | | | | 12.8 (10.0%) | | | | | 2 (1.7%) |
| PTFE | 0.5 | 0.5 | 0.5 | 0.5 | 0.5 | 0.5 | | 0.5 | 0.5 | 0.5 |

-continued

Tables of Examples

| RP | | | | | | 2.4 | 5.1 | | | |
|---|---|---|---|---|---|---|---|---|---|---|
| flame test 1 mm | V-0 | V-2 | V-0 | V-2 | V-0 | V0 | V-0 | FAIL | V-0 | V-0 |
| flame test 1.2 mm | V-0 | V-2 | V-0 | V-2 | V-0 | V0 | V-0 | V-2 | V-0 | V-0 |

| REF No | 06-52 | 06-53 | 06-54 | 12-69 | 12-79 | 12-01 | 12-06 | 12-02 | 12-07 |
|---|---|---|---|---|---|---|---|---|---|
| PC-26 | 80.9 | 81 | 80.9 | 80.9 | 80.9 | 75 | 75 | 75 | 75 |
| ABS-F | 19.1 | 19 | 19.1 | 19.1 | 19.1 | 25 | 25 | 25 | 25 |
| TPP | 6.5 | 6.9 | 6.4 | 12.7 | 12.7 | 16 | 16 | 17 | 17 |
| oligomer | 6.4 | 6.8 | 6.2 | | | | | | |
| Talc | 5.9 | 12.6 | 3.5 | 1.1 | 0.6 | 3.5 | | 3.5 | |
| | (5.0%) | (10.0%) | (3.0%) | (1.0%) | (0.5%) | (2.9%) | | (2.9%) | |
| PTFE | 0.2 | 0.2 | 0.2 | 0.2 | 0.2 | 0.5 | 0.5 | 0.5 | 0.5 |
| flame test 1 mm | V-0 | V-0 | V-0 | V-0 | V-0 | V-0 | V-2 | V-0 | V-1 |
| Izod 4 mm/kJsqm | | | | | | 29.4 | 35.7 | 25 | 32.4 |
| HDT/deg C. | | | | | | 70 | 68 | 67 | 65 |

| REF No | 10-46 | 10-47 | 10-48 | 10-49 | 10-50 | 10-52 | 10-53 | 12-53 | 12-54 |
|---|---|---|---|---|---|---|---|---|---|
| PC-26 | 80.9 | 80.9 | 82.8 | 79.1 | 80.4 | 80.9 | 79.1 | 85 | 85 |
| ABS-F | 19.1 | 19.1 | 17.2 | 20.9 | 19.6 | 19.1 | 20.9 | 15 | 15 |
| TPP | 6.4 | 5.2 | 6.5 | 6.2 | 6.5 | 6.4 | 5.6 | 6.5 | 6.5 |
| oligomer | 5.1 | 6.2 | 6.4 | 6.1 | 6.4 | 6.2 | 5.5 | 6.5 | 6.5 |
| Talc | 3.5 | 3.5 | 3.6 | 3.4 | 3.6 | 2.3 | 2.8 | 2.8 | |
| | (3.0%) | (3.0%) | (3.0%) | (3.0%) | (3.1%) | (2.0%) | (2.5%) | (2.5%) | |
| PTFE | 0.2 | 0.2 | 0.2 | 0.2 | 0.2 | 0.2 | 0.2 | 0.5 | 0.5 |
| flame test 1 mm | V0 | V0 | V0 | V0 | V0 | V0 | V0 | V-0 | V-1 |
| Izod/4 mm/KJ/sqm | | | | | | | | 9 | 16.6 |
| HDT/deg C. | | | | | | | | 78 | 77 |

| REF No | 10-33 | 10-69 | 10-17 | 10-68 | 10-35 | 10-70 | 09-11 | 10-71 | 10-37 | 08-80 | 08-81 | 08-83 |
|---|---|---|---|---|---|---|---|---|---|---|---|---|
| PC-26 | 79.8 | 79.8 | 79.8 | 79.8 | 82.1 | 82.1 | 81 | 81 | 81 | 81 | 81 | 61.2 |
| PC-22 | | | | | | | | | | | | 18 |
| SAN | 6 | 6 | 6 | 6 | 6 | 6 | 6 | 6 | 6 | 7 | 7 | 8.6 |
| ABS-F | 14.2 | 14.2 | 14.2 | 14.2 | 11.9 | 11.9 | 13 | 13 | 13 | 12 | 12 | 12.2 |
| TPP | 6 | 6 | 7.1 | 7.1 | 4.7 | 4.7 | 7 | 7 | 7 | 7 | 7 | 7.3 |
| oligomer | 6 | 6 | 7.1 | 7.1 | 9.5 | 9.5 | 7 | 7 | 7 | 7 | 7 | 7.3 |
| Talc | 3.6 | | 3.6 | | 3.6 | | 3.6 | | 3.6 | 3.6 | 3.6 | 3.7 |
| | (3.0%) | | (3.0%) | | (3.0%) | | (3.0%) | | (3.0%) | (3.0%) | (3.0%) | (3.0%) |
| RP | 2 | 2 | | | | | | | | | | 3 |
| PTFE | 0.3 | 0.3 | 0.3 | 0.3 | 0.3 | 0.3 | 0.5 | 0.5 | 0.5 | 0.5 | 0.5 | 0.5 |
| Silox. | | | 1 | 1 | | | | 1 | 1 | | 1 | |
| Wax | 0.7 | 0.7 | 0.7 | 0.7 | 0.7 | 0.7 | 0.7 | 0.7 | 0.7 | 0.7 | 0.7 | 0.7 |
| flame test (0.5 mm) | V-0 | V-2 | V-0 | V-2 | V-0 | V-2 | V-0 | V-2 | V-0 | V-0 | V-0 | V-0 |
| HDT/deg C. | | | | | | | 79 | | | | | |

Material in Tables of Examples

PC26 and PC-28 are polycarbonates of bisphenol-A having relative solution viscosities of 1.28 and 1.29 respectively, as measured at 0.5% weight/weight in methylene chloride at 25° C. using an Ubbelohde viscometer.

ABS-F is a high impact grade of acrylonitrile-butadiene-styrene graft polymer typically containing 28–37 parts of butadiene.

ABS-C is a high flow—high impact acrylonitrile-butadiene-styrene graft polymer. Typically with an izod impact strength (ASTM D-256) of approximately 30 kg-cm/cm and a melt flow index of approximately 4.8 g/10 min (ASTM D-1238, 200° C. x5 Kg, cond G).

SAN is a copolymer of styrene and acrylonitrile. Commercially available injection moulding grades of this material were used eg Lustran SAN 32 from Bayer.

Talcs used were commercially available grades and included, among other, grades such as Westmin talc from Norwegian Talc which has a particle size distribution with 98% by weight less than 8 microns or Microtalc IT Extra from Norwegian Talc which has a particle size distribution with 99% by weight less than 10 micron or Microline A-3 from Luzenac Naintsch which has a particle size distribution with 90% by weight less than 4 microns.

Vermiculites used were commercially available grades such as Micronised Vermlicuite or Micron Vermiculite from Dupre Vermiculite.

Kolins used were commercially available grades such as Devolite from English China Clay (ECC).

Micas used were commercially available grades such as SX-300 and SX-400 available from Microfine Minerals.

Wollastonites used were commercially available grades such as Vansil EW-10 or Vansil G from R.T. Vanderbilt Company Ltd.

Titanium Dioxides used were commercially available grades such as Tioxide R-TC30.

Magnesium Hydroxides used were commercially available grades such as FR20 from Dead Sea Periclase.

Glass beads used were those such as Spheriglass 5000 CP03 by Croxton & Garry.

Aluminum Oxides and Calcium Carbonates used were commercially available grades such as those available from Sigma Aldrich.

Silox.—is a polysiloxane additive as a 50% masterbatch (content shown is for masterbatch; thus actual siloxane content is half of that shown). The remaining content is a polypropylene carrier in the above examples. Others polymers may also be used for this masterbatch.

IM=impact modifier, a Paraloid core shell modifier from Rohm & Haas.

TPP=triphenyl phosphate.

Oligomer=phosphate oligomer such as Akzo Fyroflex RDP or FMC Reofos RDP or other oligomer(s).

RP=stabilised red phosphorous used as a masterbatch at 50% red rhosphorous content in a carrier resin which is ABS in the above examples (masterbatch content is shown; so actual red P content is 50% of this). Others polymers may also be used for this masterbatch.

PTFE=polytetrafluoroethylene such as Fluon grades.

CB=carbon black

WAX is a polyester based wax suitable for flow improvement and/or mould release in polycarbonate based mixtures.

What is claimed is:

1. A moulded article, prepared by molding a flame retardant thermoplastic moulding composition and containing a portion having a thickness of not more than 1.0 mm;

wherein said flame retardant thermoplastic moulding composition comprises (A) an aromatic polycarbonate in an amount of 70–85 parts by weight per 100 parts by weight of (A)+(B);

wherein (B) is at least one compound selected from the group consisting of a polymer, a copolymer, a graft polymer, and mixtures thereof;

wherein said compound (B) contains a styrene, a styrene derivative, an acrylate, a methacrylate derivative, or mixtures thereof;

wherein an amount of said compound (B) is 15–30 parts by weight per 100 parts by weight of (A)+(B);

(C) at least one phosphorous compound selected from the group consisting of a phosphate ester, a phosphate oligomer, a phosphonate, and mixtures thereof;

wherein an amount of said phosphorous compound is 8–16 parts by weight per 100 parts by weight of (A)+(B);

(D) talc in an amount of at least 0.5 weight % and less than 5 weight % of a total amount of components (A)+(B)+(C)+(D)+(E);

(E) at least one flame retardant additive or anti-drip agent selected from the group consisting of a tetrafluoroethylene polymer, a tetrafluoroethylene copolymer, a fluoropolymer, red phosphorous, and mixtures thereof;

wherein an amount of said flame retardant or said anti-drip agent is 0.1–3.0 parts by weight per 100 parts by weight of (A)+(B); and wherein said moulding composition has a UL-V0 flame retardant performance in the UL-94 vertical burning test when molded to a thickness of 1.0 mm.

2. The moulded article according to claim 1, wherein the amount of component (A) is 73–85 parts by weight; and wherein the amount of component (B) is 15–27 parts by weight per 100 parts by weight of (A)+(B).

3. The moulded article according to claim 1, wherein the amount of component (C) is 8–15 parts by weight per 100 parts by weight of (A)+(B).

4. The moulded article according to claim 1, wherein the amount of component (C) is 8–14 parts by weight per 100 parts by weight of (A)+(B).

5. The moulded article according to claim 1, wherein the amount of component (D) is 0.5–4.9% by weight of a total amount of components (A)+(B)+(C)+(D)+(E).

6. The moulded article according to claim 1, wherein the amount of component (E) is 0.2–2.5 parts by weight.

7. The moulded article according to claim 1, wherein component (B) is a mixture of one or more polymers or copolymers containing styrene and/or (meth)acrylonitrile and/or (meth)acrylate and a graft polymer of any of such polymers or copolymers with a rubber containing butadiene or butadiene-styrene or butadiene-acrylonitrile or isoprene or a silicone rubber.

8. The moulded article according to claim 1, wherein component (C) is a triphenyl phosphate, a triaryl phosphate ester, a phosphate oligomer, a polyphosphate based on a dihydric phenol, or a mixture thereof.

9. The moulded article according to claim 1, wherein component (E) is a tetrafluoroethylene polymer.

10. The moulded article according to claim 1, having a heat distortion temperature of at least 70 deg C.

11. The moulded article according to claim 1, having a heat distortion temperature of at least 72 deg C.

12. The moulded article according to claim 1, wherein said flame retardant thermoplastic moulding composition further comprises at least one additive selected from the group consisting of a coupling agent, a pigment, a stabilizer, an anti-oxidant, a flow-aid, a release agent, an anti-static agent, and a reinforcing additive.

13. The moulded article according to claim 1, wherein said flame retardant thermoplastic moulding composition is free from chlorine or bromine containing flame retardants.

* * * * *